(12) United States Patent
Novotny et al.

(10) Patent No.: US 9,123,387 B1
(45) Date of Patent: Sep. 1, 2015

(54) MAGNETIC RECORDING DRIVES WITH ACTIVE PHOTOCATALYTIC FILTRATION

(71) Applicant: WD Media, LLC, San Jose, CA (US)

(72) Inventors: Vlad Novotny, Los Gatos, CA (US); Keith R. Berding, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/573,873

(22) Filed: Dec. 17, 2014

Related U.S. Application Data

(60) Provisional application No. 62/039,998, filed on Aug. 21, 2014.

(51) Int. Cl.
*G11B 33/14* (2006.01)

(52) U.S. Cl.
CPC .................................. *G11B 33/146* (2013.01)

(58) Field of Classification Search
CPC ............... G11B 25/043; G11B 33/146; G11B 33/1453; G11B 33/1486; G11B 33/1466; G11B 33/148; G11B 19/2036
USPC ...................................................... 360/97.16
See application file for complete search history.

(56) References Cited

U.S. PATENT DOCUMENTS

| | | | |
|---|---|---|---|
| 5,235,482 A | 8/1993 | Schmitz | |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,272,694 B1 | 8/2001 | Knoth | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |
| 6,519,116 B1 | 2/2003 | Lin et al. | |
| 6,529,345 B1 | 3/2003 | Butler et al. | |

(Continued)

OTHER PUBLICATIONS

R.D. Sun, et al., "Decomposition of gas-phase octamethyltrisiloxane on TiO2 thin film photocatalysts-catalytic activity, deactivation, and regeneration," J. Photochem. Photobiol., vol. A 154, 2003, pp. 203-209.

(Continued)

*Primary Examiner* — Mark Blouin (57) ABSTRACT

One aspect of a recording device includes a memory, a head configured to access the memory, and a photocatalytic filter configured to prevent contaminants from depositing on the memory or the head, the photocatalytic filter comprising a photocatalytic material, and a light-emitting diode configured to illuminate the photocatalytic material.

20 Claims, 3 Drawing Sheets

(56) References Cited

U.S. PATENT DOCUMENTS

| | | |
|---|---|---|
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 6,997,883 B1 | 2/2006 | Hahn |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 * | 10/2007 | Ou-Yang et al. .......... 360/97.16 |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |

(56) References Cited

U.S. PATENT DOCUMENTS

| | | | |
|---|---|---|---|
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,579,296 B2 | 8/2009 | Naganuma et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,628,481 B2 | 12/2009 | Kadomatsu et al. |
| 7,633,721 B1 | 12/2009 | Little et al. |
| 7,633,722 B1 | 12/2009 | Larson et al. |
| 7,651,212 B2 | 1/2010 | Kadomatsu et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,860,416 B2 | 12/2010 | Itagaki |
| 7,864,488 B1 | 1/2011 | Pan |
| 7,887,910 B2 | 2/2011 | Kuramoto et al. |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,102,619 B2 * | 1/2012 | Chan et al. ................ 360/97.16 |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,199,568 B2 * | 6/2012 | Kwon et al. ................ 365/171 |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,376,013 B2 | 2/2013 | Bourke, Jr. et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,658,086 B2 | 2/2014 | Bourke, Jr. |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,710,436 B2 | 4/2014 | Otsuka |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2001/0000381 A1 | 4/2001 | Tuma et al. |
| 2002/0075590 A1 | 6/2002 | Garikipati et al. |
| 2003/0090842 A1 | 5/2003 | Smith |
| 2003/0142438 A1 | 7/2003 | Brown et al. |
| 2003/0153457 A1 | 8/2003 | Nemoto et al. |
| 2005/0241483 A1 | 11/2005 | Okada et al. |
| 2006/0032371 A1 | 2/2006 | Dauber et al. |
| 2006/0032372 A1 | 2/2006 | Dauber et al. |
| 2006/0081128 A1 | 4/2006 | Ball et al. |
| 2006/0164487 A1 | 7/2006 | Kadomatsu et al. |
| 2006/0199729 A1 | 9/2006 | Naganuma et al. |
| 2006/0238592 A1 | 10/2006 | Kadomatsu et al. |
| 2007/0157588 A1 | 7/2007 | Dauber et al. |

(56) References Cited

U.S. PATENT DOCUMENTS

| | | |
|---|---|---|
| 2008/0020578 A1 | 1/2008 | Auer et al. |
| 2008/0187336 A1 | 8/2008 | Itagaki |
| 2008/0242746 A1 | 10/2008 | Morimura et al. |
| 2009/0046379 A1 | 2/2009 | Kuramoto et al. |
| 2009/0294692 A1 | 12/2009 | Bourke, Jr. et al. |
| 2010/0003164 A1 | 1/2010 | Bourne et al. |
| 2010/0047115 A1 | 2/2010 | Krichtafovitch et al. |
| 2010/0051443 A1 | 3/2010 | Lee |
| 2010/0054988 A1 | 3/2010 | Lee |
| 2010/0189993 A1 | 7/2010 | Mori et al. |
| 2011/0212281 A1 | 9/2011 | Jacoby et al. |
| 2012/0080107 A1 | 4/2012 | Kruglick |
| 2013/0038964 A1 | 2/2013 | Garbarino et al. |
| 2013/0091698 A1 | 4/2013 | Banshak, Jr. et al. |
| 2013/0102054 A1 | 4/2013 | Bourke, Jr. |
| 2013/0153515 A1 | 6/2013 | Kang et al. |
| 2013/0155546 A1 | 6/2013 | Heo et al. |
| 2013/0156905 A1 | 6/2013 | Bourke, Jr. et al. |
| 2013/0240758 A1 | 9/2013 | Bourke, Jr. et al. |
| 2013/0272557 A1 | 10/2013 | Ozcan et al. |
| 2013/0290988 A1 | 10/2013 | Watson et al. |
| 2014/0067130 A1 | 3/2014 | Pillai et al. |
| 2014/0070088 A1 | 3/2014 | Otsuka |
| 2014/0134307 A1 | 5/2014 | Bourke, Jr. |
| 2014/0163303 A1 | 6/2014 | Bourke, Jr. et al. |

OTHER PUBLICATIONS

Pier Final Project Report, "Evaluation of Titanium Dioxide as a Photocatalyst for Removing Air Pollutants," California Energy Commission Report, CEC-500-2007-112, Jan. 2008, pp. 1-33.

Hashimoto, et al., "TiO2 Photocatalysis: A Historical Overview and Future Prospects," Japanese Journal of Applied Physics, vol. 44, No. 12, 2005, pp. 8269-8285.

* cited by examiner

MAGNETIC RECORDING DRIVES WITH ACTIVE PHOTOCATALYTIC FILTRATION

CROSS-REFERENCE TO RELATED APPLICATION(S)

This application claims the benefit of U.S. Provisional Application Ser. No. 62/039,998, entitled "MAGNETIC RECORDING DRIVES WITH ACTIVE PHOTOCATALYTIC FILTRATION" and filed on Aug. 21, 2014, which is expressly incorporated by reference herein in its entirety.

BACKGROUND

Information storage devices can be used to retrieve and/or store data in computers and other consumer electronics devices. A magnetic hard disk drive is an example of an information storage device that includes one or more heads that can both read and write data onto a magnetic storage disk. In a magnetic hard disk drive, each read/write head can be a sub-component of a head gimbal assembly (HGA). The read/write head typically includes a slider and a read/write transducer. The read/write transducer typically comprises a magneto-resistive read element (e.g., so-called giant magneto-resistive read element, or a tunneling magneto-resistive read element), and an inductive write structure comprising a flat coil deposited by photolithography, and a yoke structure having pole tips that face a media disk. The HGA typically also includes a suspension assembly that includes a mounting plate, a load beam, and a laminated flexure to carry the electrical signals to and from the read head. The read/write head is typically bonded to a tongue feature of the laminated flexure.

The HGA, in turn, can be a sub-component of a head stack assembly (HSA) that typically includes a plurality of HGAs, a head actuator, and a flex circuit. The mounting plate of each suspension assembly can be attached to an arm of the head actuator (e.g., by swaging), and each of the laminated flexures can include a flexure tail that is electrically connected to the HSA's flex circuit (e.g., by solder reflow bonding or ultrasonic bonding). The angular position of the HSA, and therefore the position of the read heads relative to data tracks on the disks, can be actively controlled by the head actuator which is typically driven by a voice coil motor (VCM). Specifically, electrical current passed through a coil of the VCM can apply a torque to the head actuator, so that the read head can seek and follow desired data tracks on the spinning disk.

Magnetic hard disk drives can be sensitive to low levels of specific gaseous contaminants. These contaminants can be caused by an outgassing of adhesive or other materials used within disk drives or unintended contaminants from materials and processes used in building magnetic recording drives or by contamination in environment external to the disk drive that can adsorb and react on head and disk surfaces (e.g., at the head-disk interface). When the local temperatures due to head-disk contact or heat-assisted magnetic recording (HAMR) writing and reading raise the local temperatures, these chemical reactions can occur at higher rates and additional reactions can occur. When the products of these reactions are solid or liquid materials, they can accumulate, in particular on heads, and lead to excessive head-disk contacts that raise the interfacial temperatures even higher, further speeding up this process and eventually resulting in head-disk failures. In addition, these solid or liquid materials on heads can cause an increase in head-disk spacing and degradation of magnetic performance. Very low concentrations of contaminants within the disk drive are enough to lead to these failures, and therefore it is difficult to fabricate and operate disk drives that would not have some of these contaminants present.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

The word "exemplary" is used herein to mean serving as an example, instance, or illustration. Any embodiment described herein as "exemplary" is not necessarily to be construed as preferred or advantageous over other embodiments. Likewise, the term "embodiment" of a device or method does not require that all embodiments of the invention include the described components, structure, features, functionality, processes, advantages, benefits, or modes of operation In the following detailed description, various aspects of a disk drive will be presented. These aspects of a disk drive are well suited for filtering contaminants from within a housing thereof. Those skilled in the art will realize that these aspects may be extended to all types of devices that can include disk drives such as optical disks, floppy disks, tapes, or any other suitable media capable of storing data through various electronic, magnetic, optical, or mechanic changes. Accordingly, any reference to a specific apparatus or method is intended only to illustrate the various aspects of the present invention, with the understanding that such aspects may have a wide range of applications.

One aspect of a recording device includes a memory, a head configured to access the memory, and a photocatalytic filter configured to prevent contaminants from depositing on the memory or the head, the photocatalytic filter comprising a photocatalytic material, and a light-emitting diode configured to illuminate the photocatalytic material.

Figure 1A:
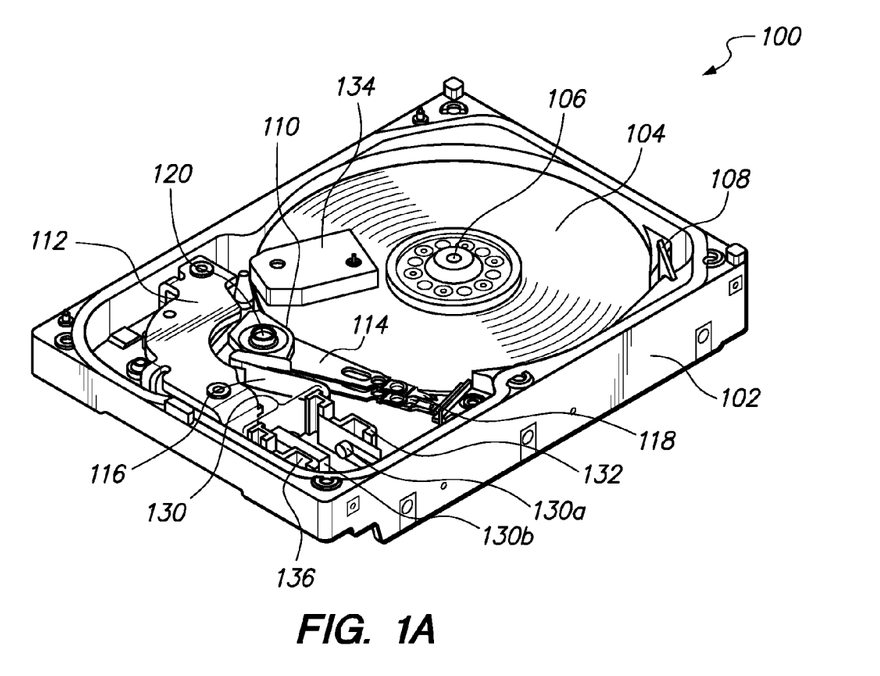
FIG. 1A is an isometric view illustrating an exemplary embodiment of a disk drive.
Figure 1B:
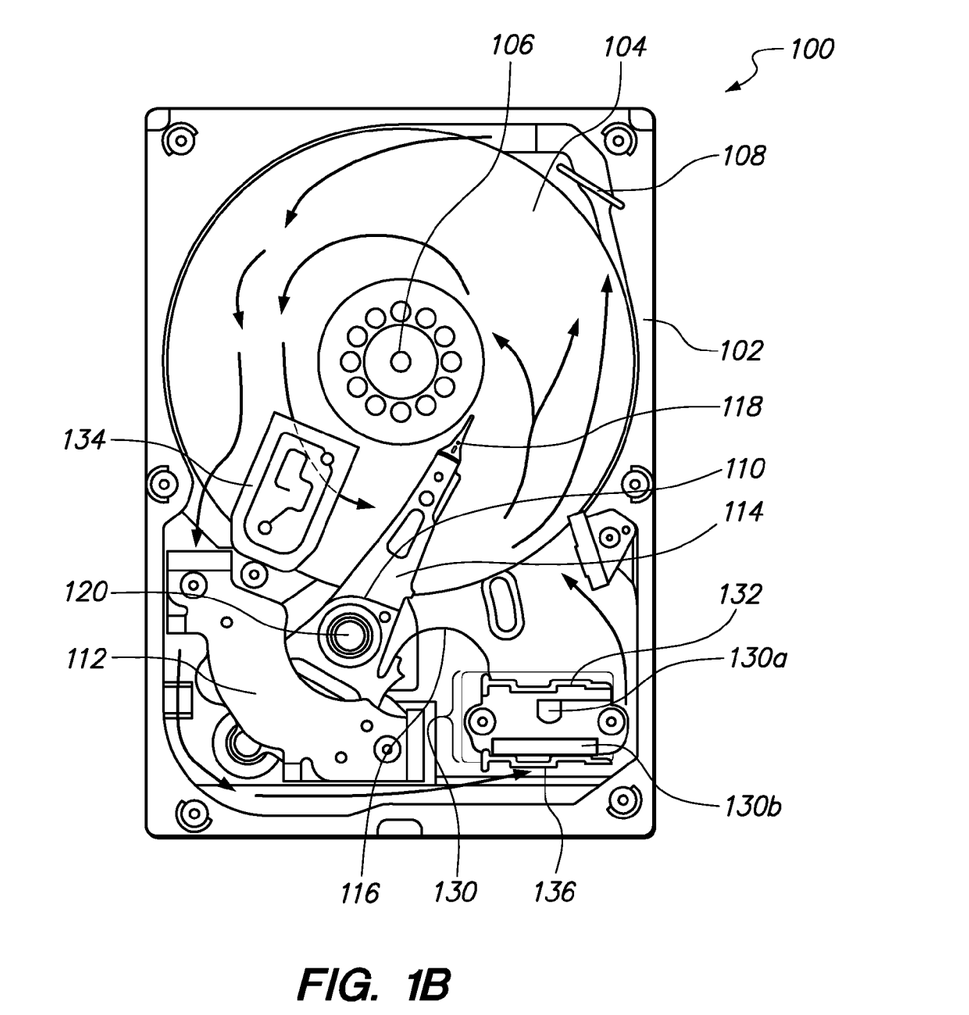
FIG. 1B is a top view illustrating an exemplary embodiment of a disk drive.

One aspect of a method for filtering contaminants within a recording device configured to access memory using a head includes powering a light-emitting diode to illuminate a photocatalytic material to prevent contaminants from depositing on the memory or the head FIG. 1 is an isometric perspective view of an exemplary embodiment of a disk drive 100 with the disk drive cover removed to enable viewing of certain internal disk drive components. The disk drive 100 can include a disk drive base 102. The disk drive 100 can further include a spindle 106, rotatably mounted on the disk drive base 102, for rotating at least one disk 104 that is mounted on the spindle 106. In certain embodiments, the disk drive 100 may have only a single disk 104, or alternatively, two or more disks. As illustrated in FIG. 1B, the rotation of the disk(s) 104 can establish air flow (e.g., depicted by arrows) within the disk drive 100. In an exemplary embodiment, the air flow can pass through an optional recirculation filter 108. In an exemplary embodiment, the disk drive 100 can also include a photocatalytic filter 130 that is configured to remove contaminants from the internal atmosphere within the disk drive 100, if and after such contaminants have entered the internal atmosphere within the disk drive 100. For example, the photocatalytic filter 130 can provide chemical filtering of organic and non-organic volatile compounds within the disk drive 100 using photochemical capture or decomposition of these compounds on a photocatalytic surface 130b illuminated with ultraviolet (UV) light generated by a UV light-emitting diode (LED) 130a. As seen in FIGS. 1A and 1B, the disk drive 100 may include a flex circuit 116 for interconnecting pre-amplifier signal lines (not shown) to the main circuit board (not shown), and the flex circuit 116 can also connect to a control line (not shown) for powering the disk drive 100, and connection to ground (not shown).

In addition, the flex circuit 116 can be modified to include a flex bracket 132 mounted on the disk drive base 100. The LED 130a of the photocatalytic filter 130 can be mounted on a vertical surface of the flex bracket 132. Referring to FIG. 1B, this would place the UV LED 130a in a location to illuminate the photocatalytic material 130b in a high airflow region as is indicated by the arrow lines, but would not allow it to illuminate the disk surface and potentially degrade the lubricant on the surface of the disk(s) 104. The air flow in the disk drive 100 can provide efficient movement of air over the photocatalytic material 130b, and this could be improved through shrouding features (not shown) added to the flex bracket 132, disk drive base 102, or other disk drive components.

The photocatalytic material 130b can be located in various locations, and accomplished many different ways, as long as the photocatalytic material 130b is in a location that permits illumination by the UV LED 130a. In an exemplary embodiment, the photocatalytic material 130b can include a metal, glass or polymeric foil coated with TiO2 particles. The foil can be mechanically attached and positioned in the disk drive 100 such that it is exposed to UV light emitted by the LED 130a. For example, the foil can include an adhesive side with non-outgassing adhesive or mounted by mechanical means without adhesives, that is configured to mount on the inside wall of the disk drive 100 opposite the UV LED 130a (shown in FIG. 1B). Moreover, the photocatalytic foil 130b could be placed on a vertical wall created on a second flex bracket 136 that is positioned to face the flex bracket 132 that supports UV LED 130a. Other locations in the disk drive 100 could be used for the filtering device 130, like the area near the recirculation filter 108, although this configuration not shown in the figures.

The photochemical filtration can be performed continuously or intermittently during operation of the drive operation with variable LED power. A wide range of chemical compounds can be effectively removed or at least reduced in their concentration so that head-disk interface is not sensitive to smear formation and head-disk failures. Smear formation on the head and/or disk can be caused by, for example, a buildup of chemical compounds at the head-disk interface. The smear formation can cause a fly height failure at the head-disk interface when the smear exceeds the fly height causing the head to make contact with the disk. The photocatalytic material 130b can include a high surface area material that adsorbs contaminants effectively and allows them to react under the exposure to UV or short wavelength visible light on the photocatalytic surface 130b before they buildup at the head-disk interface. In this way, head-disk fly height failures may be reduced and/or prevented.

In an exemplary embodiment, the light-emitting diode 130a can include materials, such as GaAlN, GaN or GaAlP that emit light when in the presence of an electric field of sufficient strength and current density. For example, the material of the LED 130a can be selected such that it emits light in the ultraviolet range of 360-390 nm or 260-270 nm. The photocatalytic material 130b can include a material such as titanium oxide that has a large surface area (e.g., about 100 $m^2/g$) which may enable the photocatalytic material 130b to adsorb a larger quantity of contaminants. Using titanium dioxide ($TiO_2$) as the photocatalytic material 130b may allow catalytic oxidation of adsorbed contaminant molecules in the presence of above-bandgap ultraviolet light (e.g., wavelengths smaller than 390 nm) emitted by the LED 130a. In an exemplary embodiment, the anatase form of titanium oxide can be used as the photocatalytic material 130b. There is no particular molecular weight or size limitation on contaminant molecules that can be filtered by the photocatalytic filter 130. For example, the particle size of the contaminant molecules can be in the range of 5 to 50 nm. The absorption of UV light produces electron-hole pairs in the $TiO_2$ particles of the photocatalytic material 130b. The holes and electrons produced by absorption of the UV light can either recombine or migrate to the surface of the photocatalytic material 130b. If holes reach the surface, they can react with hydroxyl groups on the surface of the photocatalytic material 130b and form highly reactive hydroxyl radicals. These radicals can form when a hydroxyl group loses its unpaired electron during an encounter with a hole. Hydroxyl radicals are electrically neutral but highly reactive chemically. Electrons reaching the surface can react with oxygen and generate negatively charged oxygen species which are also highly reactive. Consequently, airborne contaminant molecules within the disk drive 100 can be adsorbed onto the surface of the photocatalytic material 130b, at which time the airborne contaminant molecules react with hydroxyl radicals or negatively charged oxygen located on the surface of the photocatalytic material 130b. An adsorbed contaminant molecule can also react directly with the hole without the need for an intervening hydroxyl radical. Reaction products usually remain on the surface until they are fully oxidized. For example, benzene ($C_6H_6$) oxidizes to form six $CO_2$ molecules and three $H_2O$ molecules.

A $TiO_2$ photocatalytic material 130b can have a surface area of about 100 $m^2/g$ or greater. Assuming the disk drive 100 has an internal volume of the order of $10^3$ $cm^3$, and that the typical concentrations of contaminants are in ppb or lower range, but taking into account excessive 100 ppb concentrations, then tens of mg of photocatalytic material 130b would be needed for 10 year operation of the disk drive 100. Some byproducts of these reactions may stay on the surface of the photocatalytic material 130b and it needs to be assured that the surface will not come even close to saturation, which in an exemplary embodiment should be possible with about 100 mg of photocatalytic material 130b. For example, the anatase form of $TiO_2$ can be used as the photocatalytic material 130b. The anatase form of $TiO_2$ can take various forms, such as a highly porous, sol-gel, or nanocrystalline form and/or be nitrogen doped. However, other photocatalysts (e.g., $Bi_2O_3$) that allow the adsorption of contaminants can be used as the photocatalytic material 130b instead and/or in addition to $TiO_2$ without departing from the scope of the present disclosure.

The reactions typically require the LED 130a to produce a UV flux greater than about 0.1 mW/cm$^2$. The reaction rates are proportional to the photon flux, and due to the small internal volume of the disk drive 100 and low concentration of organic compounds in the drive, very low LED optical power (e.g., less than about 1 mW) is needed. The driving requirements are in 3.1 to 3.5 V and a few mA, with electrical power consumption less than about 5 mW. Thus, the LED 130a may be turned on continuously during the operation of the drive and not impact the power consumption of the drive significantly.

A wide range of volatile organic compounds and non-organic compounds can be effectively filtered using the photocatalytic filter 130. For example, each of the following compounds can be filtered using the photocatalytic process described herein: ammonia, trimethylamine, methyl mercaptan, carbon disulfide, hydrogen sulfide, dimethyl sulfide, dimethyl disulfide, benzene, p-xylene, o-xylene, m-xylene, toluene, ethylebenzene, styrene, 1,2,4-trimethylbenzene, C4 alkylbenzenes, C10 alkylbenzenes, C11 alkylbenzenes, C12 alkylbenzenes, naphthalene, formaldehyde, acetaldehyde, propionaldehyde, butyraldehyde, isovaleraldehyde, valeraldehyde, hexanal, acrolein, crotonaldehyde, benzaldehyde, acetic acid, propionic acid, n-butyric acid, isovaleric acid, n-valeric acid, acetone, silane, siloxane, decamethylcyclopentasiloxane, nitrogen compounds, sulfur compounds, aromatic hydrocarbons, aldehydes, acids, ketones, ethers, esters, alcohols, glycol ethers, alkane hydrocarbons, terpene hydrocarbons, halo hydrocarbons, alkene hydrocarbons, methyl ethyl ketone, methyl isobutyl ketone, tert-butyl methyl ether, butyl acetate, 2,2,4-trimethyl-1,3-pentanediol monoisobutyrate, 2,2,4-trimethyle-1,3-pentanediol diisobutyrate, ethanol, 2-propanol, 1-butanol, isobutyl alcohol, 2-ethyl-1-hexanol, phenol, α-terpineol, γ-terpineol, butylated hydroxytoluene, 2-butoxyethanol, ethylene glycol, 2-(2-butoxyethoxy) ethanol, n-nonane, n-decane, n-undecane, n-dodecane, n-tridecane, n-tetradecane, α-pinene, camphene, d-limonene, p-cymene, γ-terpinene, terpinolene, trichlorofluoromethane, dichloromethane, 1,1,1-trichloroethane, trichloroethene, tetrachloroethene, 1,2-dichlorobenzene, ethylene, and 1,3-butadiene, just to name a few.

Referring to FIG. 1B, the spinning disk(s) 104 can provide efficient air flow over the photocatalytic filter 130 to ensure effective exposure of the drive gas to the photocatalytic surface 130b. The disk drive 100 can also include an air flow barrier 134 that is configured to direct additional air flow created by the spinning disk(s) 104 towards the photocatalytic filter 130. With further reference to FIGS. 1A and 1B, the disk drive 100 can further include a head actuator 110 that is pivotally mounted on disk drive base 102 by an actuator pivot bearing 120. The head actuator 110 may include a plurality of actuator arms (e.g., actuator arm 114), each supporting a head gimbal assembly (e.g., HGA 118). For example, the HGA 118 may be attached to a distal end of the actuator arm 114 by a process known as swaging. Preferably the disk drive 100 will include one HGA 118 per disk surface, but depopulated disk drives are also contemplated in which fewer HGAs are used. In FIG. 1A, the HGAs 118 are shown demerged from the disk 104, so that the disks do not obscure the HGAs from view. In such position, the HGAs can be supported by a conventional head loading ramp (not shown in FIGS. 1A and 1B so that the view of the HGAs will not be obstructed).

The distal end of the HGA 118 may include a read/write head (too small to be seen in FIGS. 1A and 1B) for reading and writing data from and to a magnetic disk (e.g., disk 104). The read/write head may optionally include a ceramic slider substrate and a read/write transducer that may be an inductive magnetic write transducer merged with a magneto-resistive read transducer (e.g., a tunneling magneto-resistive read transducer). The head may also include other structures for performing other functions (e.g., writer, microactuator, heater, lapping guide, etc). Note also that in certain optical disk drives, it is possible for a read/write head to include an objective lens rather than a read transducer. Referring to FIGS. 1A and 1B, a magnet 112 may provide a magnetic field for a voice coil motor to pivot the head actuator 110 about the actuator pivot bearing 120 through a limited angular range, so that the read/write head of HGA 118 may be desirably positioned relative to one or more tracks of information on the disk(s) 104.

Figure 2:
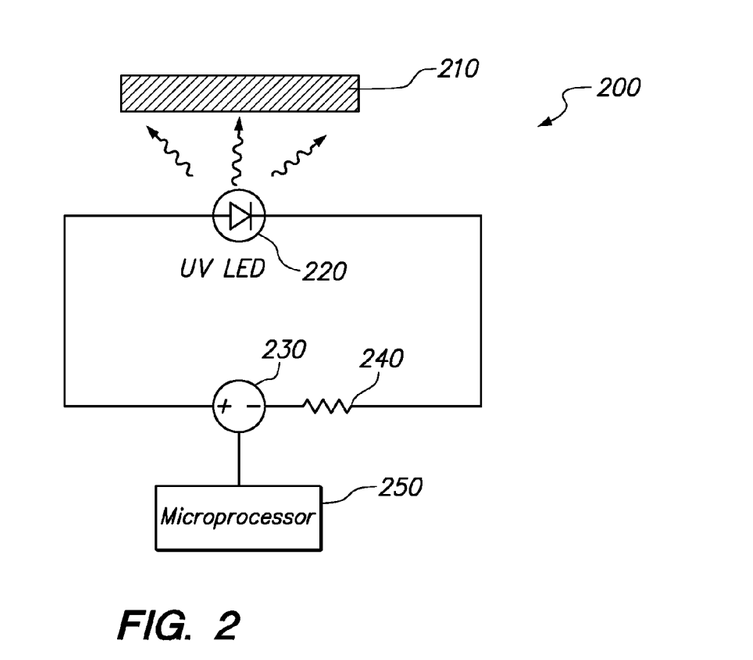
FIG. 2 is a schematic diagram illustrating an exemplary embodiment of a photocatalytic filtering apparatus for use in a disk drive.

FIG. 2 is a schematic diagram illustrating an exemplary embodiment of a photocatalytic filter 200 for use in a disk drive, such as the disk drive 100 illustrated in FIGS. 1A and 1B. For example, a UV LED 220 can be part of an electrical circuit and used to illuminate a photocatalytic material 210 with UV light. The UV LED 220 can receive power from power source 230 that delivers a required voltage and current to the UV LED 220. A ballast resistor 240 can be connected in series to the UV LED 220 and used to limit the electrical current received by the UV LED 220. The duty-cycle of the UV LED 220 can be controlled using a microprocessor 250 that includes control circuitry, and the desired optical flux of the UV LED 220 can be controlled by the power of the power source 230. In addition, microprocessor 250 can control the duty-cycle of filtering operation.

Figure 3:
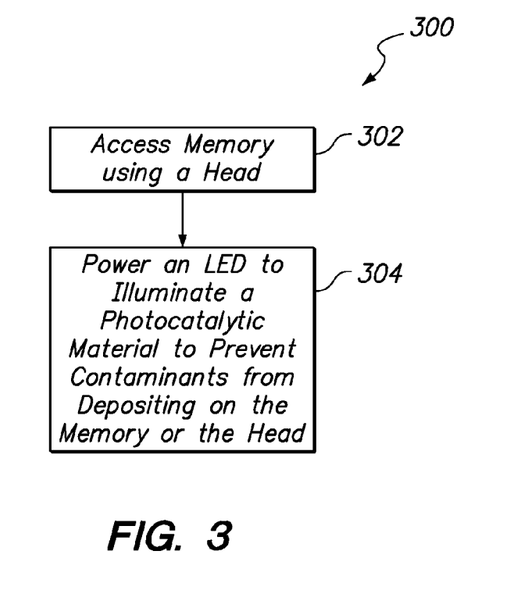
FIG. 3 is a flowchart illustrating an exemplary embodiment for filtering contaminants within a disk drive.

FIG. 3 is a flowchart 300 illustrating an exemplary embodiment for filtering contaminants within a recording device. For example, the recording device can include a disk drive such as the one illustrated in FIGS. 1A and 1B. Each of the steps in the flow chart can be controlled using one or more processors of the disk drive or by some other suitable means. As represented by block 302, a memory can be accessed using a head. For example, with reference to FIGS. 1A and 1B, the memory can include at least one disk 104 that is accessed using the head gimbal assembly 118 for reading and writing data from and to the disk(s) 104. In an exemplary embodiment, the head can include a read head or a write head. As represented by block 304, an LED can be powered to illuminate a photocatalytic material to prevent contaminants from depositing on the memory or the head. For example, with further reference to FIGS. 1A and 1B, a photocatalytic filter 130 including a light-emitting diode (LED) 130a and a photocatalytic material 130b can be provided in the disk drive 100. The photocatalytic material 130b can be located in various locations within the disk drive 100, and accomplished many different ways, as long as the photocatalytic material 130b is in a location that permits illumination by the LED 130a. In an exemplary embodiment, the LED 130a can be mounted on a flex circuit 116 of the disk drive 100 by soldering. Moreover, referring to FIGS. 1A and 1B, the disk drive 100 can also include an air flow barrier 134 that is configured to direct the air flow created by the spinning disk(s) 104 towards the photocatalytic filter 130.

Some of the benefits provided by the photocatalytic filtering system described herein include effective removal of volatile organic and non-organic compounds from the disk drive 100, reduction of head-disk interface failures, significant reduction of corrosive gases from the drive, lowering the sensitivity of heads and media to corrosion, less stringent constraints on outgassing compounds resulting in potentially lower cost of disk drive components, and improved reliability of perpendicular magnetic recording (PMR) devices and heat-assisted magnetic recording (HAMR) devices resulting in lower return rates and higher profit margins, just to name a few.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A recording device, comprising:
   a memory;
   a head configured to access the memory; and
   a photocatalytic filter configured to prevent contaminants from depositing on the memory or the head, the photocatalytic filter comprising:
      a photocatalytic material; and
      a light-emitting diode configured to illuminate the photocatalytic material.

2. The device of claim 1, further comprising control circuitry configured to control power and a duty cycle of the light-emitting diode.

3. The device of claim 2, wherein control circuitry is configured to power the light-emitting diode intermittently.

4. The device of claim 2, further comprising a flex circuit coupled to the control circuitry, wherein the light-emitting diode is mounted on the flex circuit.

5. The device of claim 4, wherein the light-emitting diode is soldered to the flex circuit.

6. The device of claim 4, further comprising:
   a base; and
   a bracket mounted on the base;
      wherein the flex circuit is mounted on the bracket.

7. The device of claim 1, further comprising a housing containing the memory, the head, and the photocatalytic filter therein.

8. The device of claim 7, wherein the photocatalytic material is configured to adsorb the contaminants within the housing and convert the contaminants into inert compounds when illuminated by the light-emitting diode.

9. The device of claim 7, further comprising an air flow barrier located within the housing, the air flow barrier configured to redirect an air flow within the housing towards the photocatalytic filter.

10. The device of claim 1, wherein the photocatalytic material includes an anatase form of titanium dioxide.

11. A method for filtering contaminants within a recording device configured to access memory using a head, the method comprising:
   powering a light-emitting diode to illuminate a photocatalytic material to prevent contaminants from depositing on the memory or the head.

12. The method of claim 11, further comprising controlling a power and duty cycle of the light-emitting diode using control circuitry.

13. The method of claim 12, further comprising powering the light-emitting diode intermittently using the control circuitry.

14. The method of claim 13, wherein the light-emitting diode is mounted on a flex circuit coupled to the control circuitry.

15. The method of claim 14, wherein the light-emitting diode is mounted on the flex circuit by solder.

16. The method of claim 15, wherein the flex circuit is mounted on a bracket that is mounted to a base of the recording device.

17. The method of claim 11, wherein the recording device comprises a housing, the memory, the head, and a photocatalytic filter being within the housing.

18. The method of claim 17, wherein the photocatalytic material is configured to adsorb the contaminants within the housing and convert them into inert compounds when illuminated by the light-emitting diode.

19. The method of claim 17, wherein the recording device further comprises an air flow barrier within the housing, wherein the air flow barrier is configured to direct an air flow within the housing towards the photocatalytic filter.

20. The method of claim 11, wherein the photocatalytic material includes an anatase form of titanium dioxide.

* * * * *